United States Patent
Treeby et al.

[11] Patent Number: 5,899,654
[45] Date of Patent: May 4, 1999

[54] COMMODITY CONTAINER FLOW INITIATOR

[76] Inventors: Colin H. Treeby, R.R. 1, Admire, Kans. 66830; Robert P. Ferguson, 1638 W. 600 North, Leesburg, Ind. 46538

[21] Appl. No.: 08/554,830

[22] Filed: Nov. 7, 1995

[51] Int. Cl.⁶ .................................................. B64G 65/23
[52] U.S. Cl. .................... 414/417; 414/346; 414/525.1
[58] Field of Search .................................. 414/486–488, 414/417, 408, 419–421, 509, 346, 525.1, 304–306, 325, 725; 222/200

[56] References Cited

U.S. PATENT DOCUMENTS

| | | | |
|---|---|---|---|
| 3,581,924 | 6/1971 | Marz | 414/725 X |
| 3,771,531 | 11/1973 | Scribner | 414/346 X |
| 3,837,516 | 9/1974 | Meyer | 414/509 X |
| 4,430,038 | 2/1984 | Rempel et al. | 414/346 |
| 4,662,160 | 5/1987 | Hubbard et al. | 414/346 X |
| 4,978,271 | 12/1990 | Seader | 414/487 |
| 5,165,525 | 11/1992 | Quaeck | 414/525.1 X |
| 5,221,173 | 6/1993 | Barnes | 414/346 |
| 5,338,140 | 8/1994 | Ekdahl et al. | 414/346 |

FOREIGN PATENT DOCUMENTS

| | | | |
|---|---|---|---|
| 1096286 | 12/1960 | Germany | 414/487 |
| 6704877 | 4/1967 | Netherlands | 414/487 |

*Primary Examiner*—David A. Bucci
*Attorney, Agent, or Firm*—Bruce J. Clark

[57] ABSTRACT

A commodity container flow initiator is shown for initiating gravity flow of a commodity from a bin having typically four sides and a bottom, wherein one side is the unloading side of the bin when the bin is tipped on that side for unloading, wherein the invention has a substantially rigid planer member comprising a sliding deck that is slidably attached to the inside of the unloading side of the bin so as to allow the deck to selectively slide any direction substantially coplaner with the unloading side of the bin. Hydraulic cylinders are affixed to the bin and to the deck to provide moving force to slidably move the deck.

17 Claims, 8 Drawing Sheets

COMMODITY CONTAINER FLOW INITIATOR

BACKGROUND OF INVENTION

The present invention relates primarily to bins used in the field during harvest to hold commodities such as corn, silage and the like, where said bins are typically later tipped to allow gravity unloading into a larger transport trailer.

It is a known problem in the art that when dumping commodities such as ear corn, chopped silage, green beans, sugar cane, etc., that as the commodity is harvested in the field into the bins, material often tends to adhere together. The severity of the problem depends on several factors including weather, moisture content, consistency and other properties peculiar to the particular commodity involved. However, it is necessary to unload the bins into a larger truck and the problem then arises that as these full bins are raised above the side of the truck and tilted to dump the commodity, such a severe angle is often required that the entire commodity at one point suddenly unloads in one large mass. This can be extremely damaging to the containers and it can be extremely unsafe to an individual assisting in the unloading who might be standing on top of the truck; moreover, only a partial amount of the commodity is often needed to fill the truck. In other situations, only a partial amount of the commodity is needed at a particular location in the truck to more evenly allow distribution of the commodity throughout the truck.

Continuous conveyors using chains, belts or other conveying mechanisms, vibrators, and reciprocating floor systems are usually more mechanically elaborate, more expensive to build and maintain, less reliable and less durable. Moreover, vibrators, for example, can be loud, unpleasant, and are particularly hard on the bins themselves providing unnecessary stress on its structure. Some are unable to be added to existing bins and if so are expensive.

Consequently what is desired is a safe, effective, relatively inexpensive device that is reliable, simple to build and use, and durable, that facilitates the unloading by initiating the flow of the commodity so as to allow gravity to take over, upon demand. It is also a primary objective to provide such a system that is not only safe for the operators and those involved with the unloading process, but allows for minimal damage to the commodity involved by providing a substantially planar member that covers the hydraulic mechanisms or other moving parts, that provides for minimal movement in use and provides for minimal stress on the structure itself. It is a further object of the invention to help prevent the sudden dumping of the entire load in an entirely uncontrolled fashion and to further prevent undesirable shock to the truck or other hauling vehicle should the load otherwise empty as one solid mass.

The invention then is designed to overcome the problems of the prior art and meet these objectives and comprise a device that can be added to one side of existing bins as well as incorporated into new bins upon manufacture in an inexpensive manner. The device is easy to operate and simple to maintain.

Other objects and features of the invention and the manner in which the invention achieves its purpose will be appreciated from the foregoing and the following description and the accompanying drawings which exemplify the invention, it being understood that changes may be made in the specific method and apparatus disclosed herein without departing from the essentials of the invention set forth in the appended claims.

DESCRIPTION OF THE PREFERRED EMBODIMENT

Figure 1:
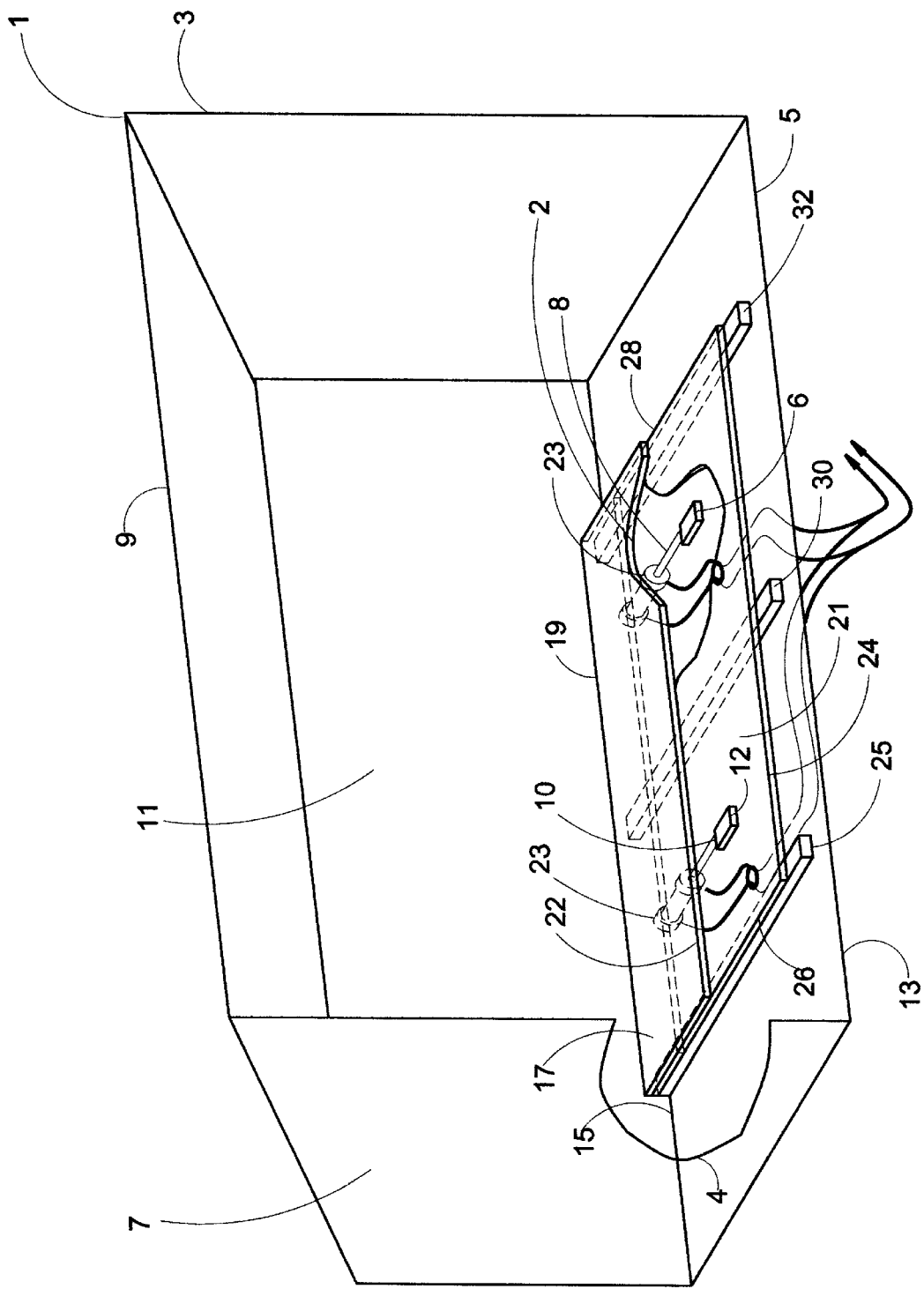
FIG. 1 is a perspective view of the interior of the commodity container, showing a cutaway portion.

The invention is shown in its perspective form in FIG. 1 affixed to a typical commodity container, in this particular case a bin commonly used for seed corn. The invention however can be used with some slight modifications as discussed hereafter for any commodity including green beans, silage, sugar cane, or others where the commodity tends to have a cohesive nature. A cutaway view is shown at 2 and 4.

Figure 6:
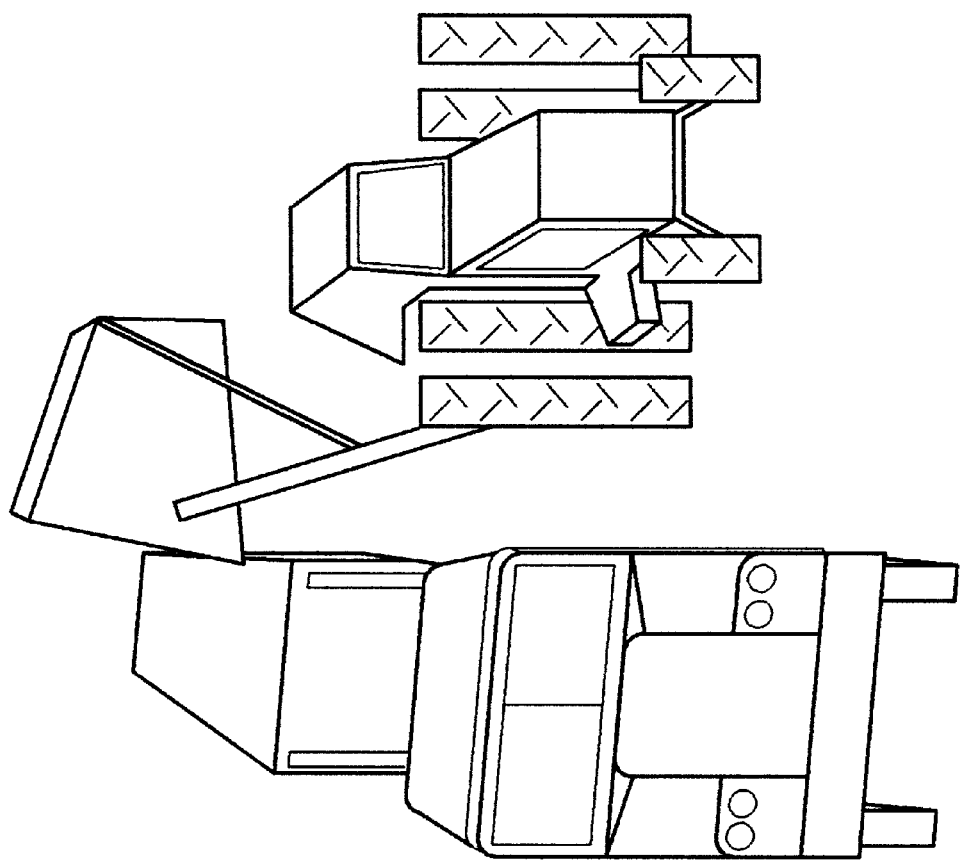
FIG. 6 shows the approximate angle of the container during unloading of the commodity at about the time of activation of the invention.

In the preferred mode, the bin 1 with which the desired commodity is to be used has four sides 3, 5, 7 and 9, and has a bottom 11. As can be seen in FIG. 6 when the bin is tilted, one side, the unloading side, which is typically substantially planar, becomes the bottom upon tilting for unloading. In FIG. 1, the unloading side 5, has affixed to it the invention in a coplaner fashion on the interior. Side 5 has a back edge 15 and a front edge 13 over which the commodity will empty.

A rigid substantially planar portion 21 comprising a sliding deck is shown having a rearward edge 22, a front edge 24 opposite thereto, and two opposing sides 26 and 28. A second rigid planar member 17 is fixed to elongated rigid members 25, 30 and 32 so as to allow the rear edge 22 of the slidable planar member to slide underneath the fixed planar member 17. Rigid, for deck purposes here, refers to metal, plastic, and includes materials that are semi-flexible, such as galvanized sheet metal, so long as the hydraulic cylinder when attached to the deck at one location can move the entire deck slidably back and forth. Substantially rigid planar member includes the contoured version in FIG. 4. While it also includes two or three planar members connected together, to accomplish the slight bend in FIG. 4 for example, the invention works best with only one longer slidable planar member.

Elongated members 25, 30 and 32 are attached to the interior of the unloading side and provide support for the sliding deck. Hydraulic cylinders 23 are affixed and provide the reversible sliding movement via the cylinder rods 8 and 10 attached to the deck at 6 and 12.

Figure 2:
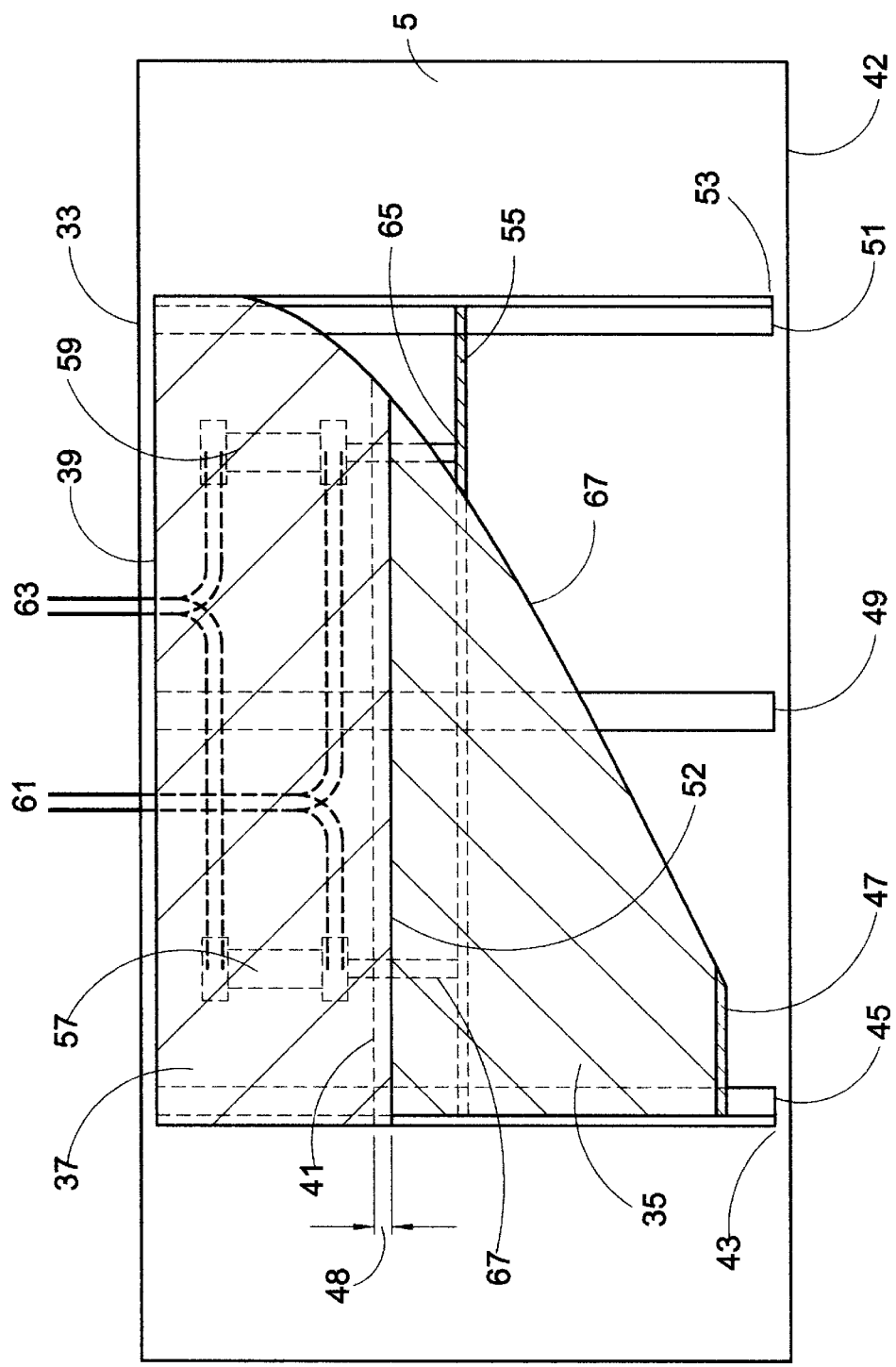
FIG. 2 is a top view of the hydraulic control mechanism on the bin showing a cutaway portion.

FIG. 2 shows the top view, enlarged, of the invention. It can be seen that the rear edge 39 of the fixed planar member is, in the preferred mode, located at the rear edge 33 of the unloading side 5 of the bin. However, in the preferred mode, the rear edge 39 of said fixed planar member 37 is adjacent the bottom of the bins and is sufficiently rearward so as to cover the rear edge 41 of the slidable planar member in its most extreme position.

The elongated rigid members 45, 49 and 51 are shown in FIG. 2 affixed to the unloading side of the bin 30, extending from near the front edge 42 (also referred to as the top edge) of the bin to near the rear edge 39 of the fixed planar member 37. In the preferred mode these act as supports for the sliding motion of the sliding planar member 35, however it should be understood that other means for allowing support, including the bin unloading side itself, are envisioned so as to allow the sliding member 35 to move in a sufficient approximately coplaner manner depending on the means for providing the moving motion. While shown are hydraulic means, other means are envisioned including pneumatic, electric, or other means. It is only significant that the planar member 35 be small enough so as to allow sufficient a generally forward motion stroke upon demand so as to move some of the commodity forward and so as to allow other commodity to fall behind the planar member 35 near the rear of the unloading side at 39. In the preferred mode, some of the commodity remain fixed in some fashion at the rear and/or sides during movement of the planar member 35. In this manner, moving the planar member forward just slightly, not necessarily repeatedly, often provides the necessary movement at the right elevation and angle of the bin so as to initiate the commodity flowing so as to help prevent the commodity from adhering to itself in a single mass or glob. However in some situations the need may arise to selectively continue the forward stroke, and back if necessary, of the planar member 35.

The rear 41 of the planar member 35 is shown being overlapped by the front edge 52 of the fixed planar member by a distance shown as 48. In this manner, the fixed planar member provides a non-moving support to keep the rear portion of the commodity fixed while the planar member 35 moves forward carrying the commodity directly above it forward. One or more hydraulic cylinders, or other means for causing the sliding movement, are envisioned. In the preferred mode, two hydraulic cylinders 57 and 59 are shown as the means for moving the planar member 35 via cross-bar 55 attached to the underside of the planar member 35, which cross-bar slidably moves on top of elongated members 45, 49 and 51. In the preferred mode, as shown in FIG. 3, the intermediate bearing surface, such as certain types of polymer or plastic, is shown as 121, 123 and 125, to facilitate the sliding motion.

The front edge 47 of the planar member 35, in this mode, is shown towards the front with the cutaway shown at 67.

Figure 3:
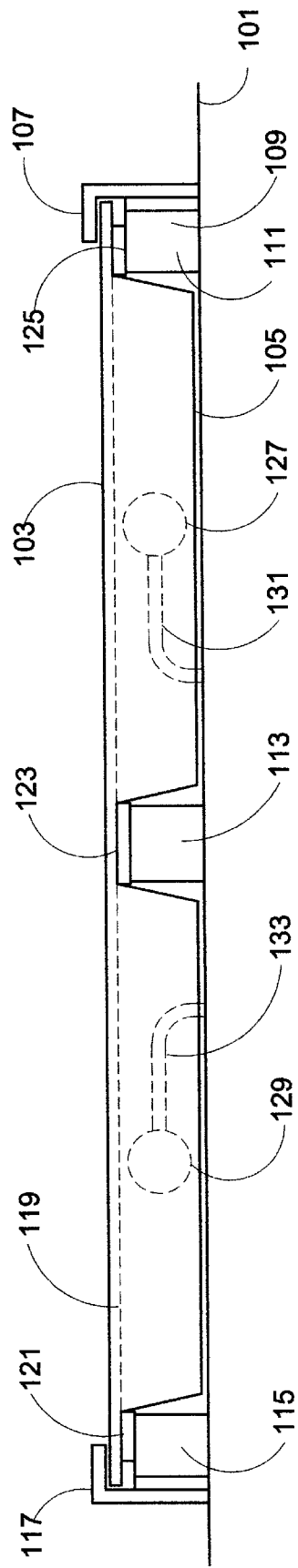
FIG. 3 is a front view of the invention shown on the commodity container.

In FIG. 3, it can be seen that the sliding planar member 103 is overlapped and maintained by rigid right angle members 107 and 117, affixed to the side 101 or to the elongated rigid members 109 and 115.

Figure 4:
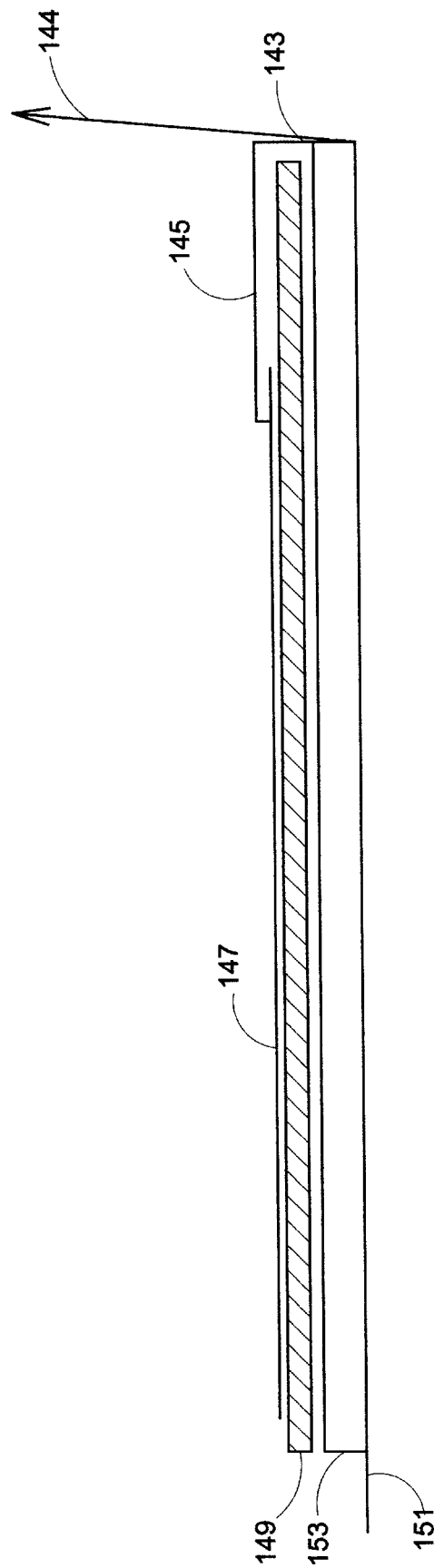
FIG. 4 is a side view of the invention shown in FIG. 2 looking from the right side.

FIG. 4 shows the side view of the invention shown in FIG. 1 from the right side. There the bearing material 149 can be seen situated between the planar member 147 and the elongated rigid member 153. The fixed planar member is shown attached to the elongated rigid member 153 at the rear end 143, although the fixed planar member can be affixed near the rear otherwise. The bottom of the bin is shown as 144.

Figure 5:
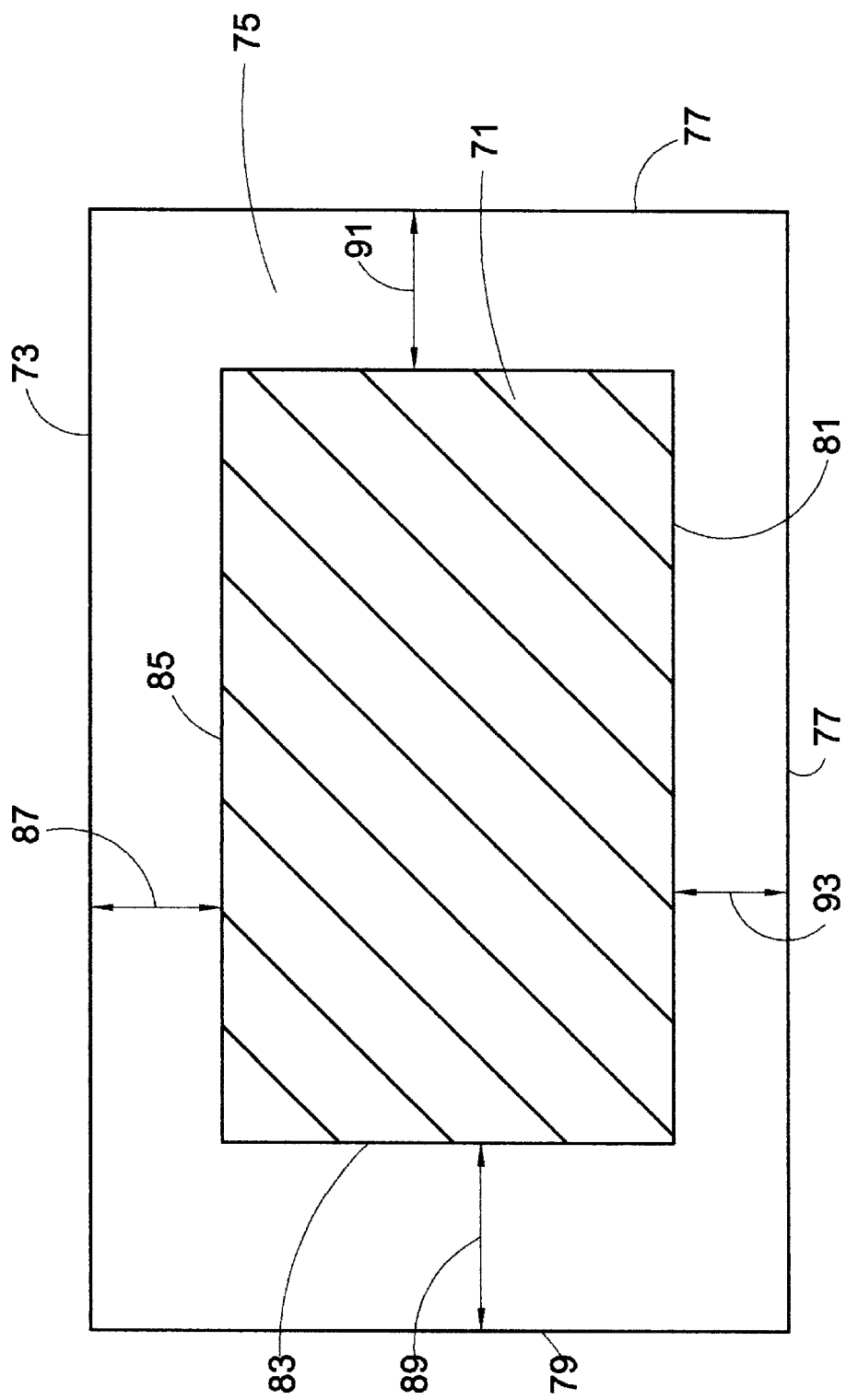
FIG. 5 is a top view showing the relative size of the sliding deck in relation to the size of the bin unloading side, in the preferred mode for unloading corn as a commodity.

FIG. 5 shows the preferred size of the deck relative to the surface size of the unloading side of the bin. The invention works best when the deck 71 is sufficiently smaller (distance 87) at the rear 85 to allow at least one element of the intended commodity (one or more ears of corn for example, length wise) to fall therebetween, and operation is further enhanced by allowing at least a similar distance 89, 91 and 93 on the sides and at the front. The invention still works adequately if the deck 71 is of the same size as the unloading side, but moves out during the stroke over the front edge 77 so as to allow a distance 87 sufficient to allow the commodity to fall therebetween.

Figure 7:
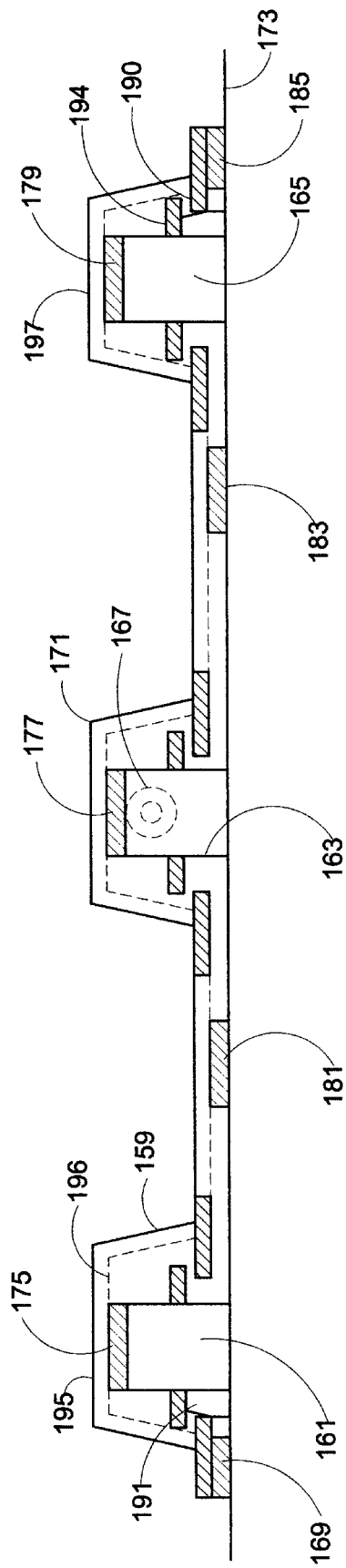
FIG. 7 shows an alternative mode of the invention.

FIG. 7 shows an alternative mode of the invention from the front in which the planar member 159 follows generally the contour of the bin unloading side, including allowance for the elongated rigid members 161, 163 and 165 often part of existing bins, along with a single central located cylinder 167. Also shown in FIG. 7 are plastic bearing members 169, 175, 177, 179, 181, 183 and 185. The end bearing portions 169 and 185 are situated between the unloading side 173 and the contoured planar member 171. The back extension tabs shown, such as 190 and 194 act together to allow the deck sliding motion while retaining the deck securely to the unloading side 173. The contoured planar portion is affixed to the similarly contoured cross-member portion via welds, in this example shown at 196 and 197. This rigid cross-member element also serves to support the deck comprised of a rigid, yet flexible material discussed earlier, such as a deck made of slightly flexible sheet metal. This alternative version allows for fewer elongated members, allows for more capacity in the container and allows more easily for single hydraulic cylinder use, and allows for easier installation and more precise sliding movement.

It should be clear that the material comprising the invention may be steel, aluminum, plastic or any material of sufficient strength for the desired conditions. There may be one or more hydraulic cylinders. The movement of the planar rigid member should be in a direction generally perpendicular to the direction of the flow of the commodity over the front edge of the bin however it need not be exactly in a perpendicular direction. Certain non-linear motions are envisioned that might equally provide the sufficient forward motion to generally move the adjacent material in a forward direction.

Figure 8:
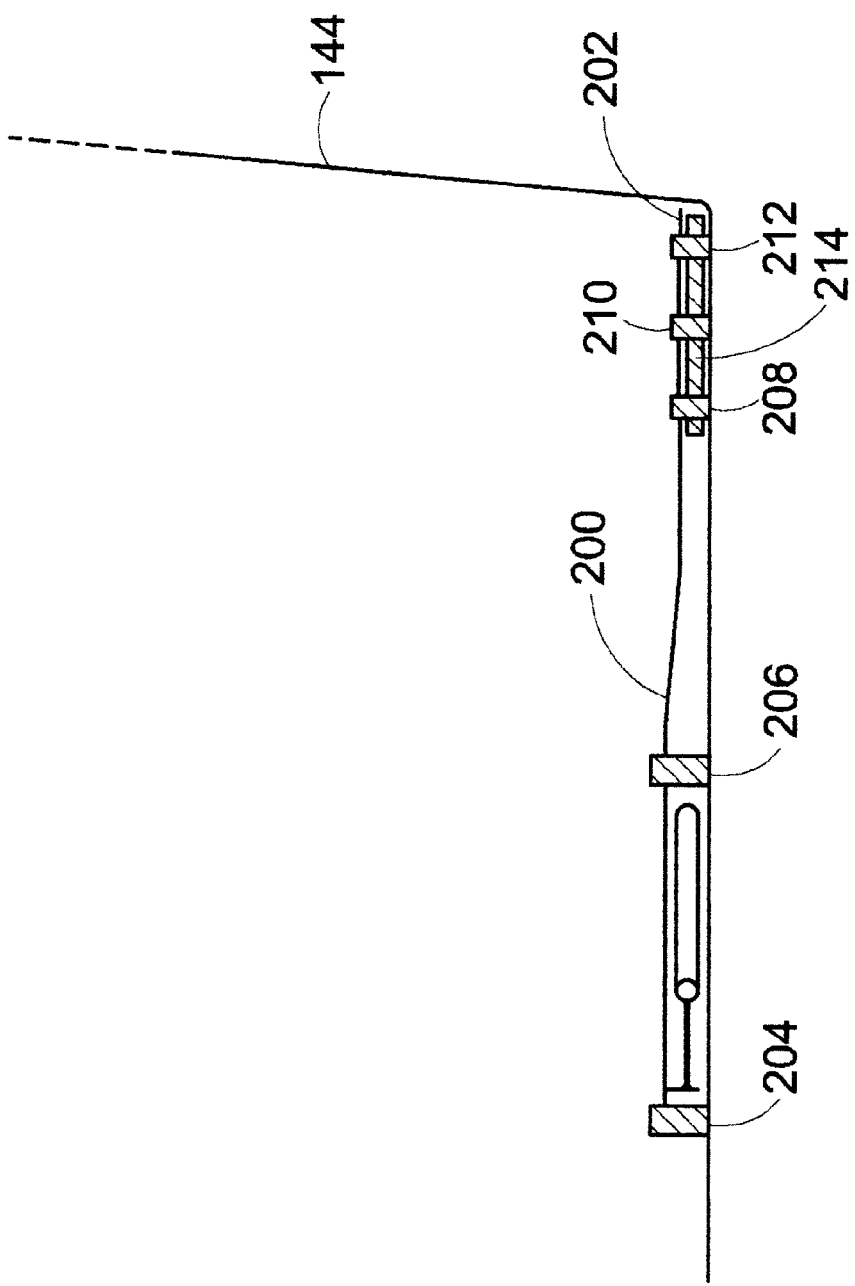
FIG. 8 is a still alternative view of the invention from the side showing a single sliding deck without the fixed planar member.

In a still alternative mode, FIG. 8, a single sliding deck 200, without a fixed planar member, may be utilized, wherein the rear edge 202 of the deck is slidably secured to the edges using rigid right angle members 204, 206, 208, 210, 212, affixed to the unloading side. The rigid deck here is slightly flexible and slides on bearing member 214.

It should also be understood that in the preferred mode, use of two or more hydraulic cylinders would require a flow divider-combiner on each hydraulic line to equalize the movement on each cylinder so as to facilitate precise forward movement of the planar rigid member. By adding a hydraulic reversing mechanism, inversion valve, or other electrical reversing mechanism such as a solenoid valve, the system can be designed to automatically reverse itself at the end of each stroke.

Also, for some commodities, ridges or wedges can be affixed to the surface of the planar rigid member so as to provide means for grabbing the commodity to move it forward.

In use, as can be seen in FIG. 6, the bin, filled with the desired commodity, is raised to a sufficient level to dump the commodity into a truck, and tilted to allow the dumping. At the desired tilt, the operator of the tractor or other mechanism below operates the necessary hydraulic control to operate the cylinder so as to move the planar rigid member forward slightly in a selectable fashion as required or in the sufficient amount so as to move some of the commodity forward and initiate some unloading of the bin. It will be seen in operation that such movement is sufficient to in many cases, on single stroke manual operation, so as to initiate flow of commodities. By commencing the flow earlier in the tilting process in this manner, it becomes unnecessary to raise the bin as high as would be required otherwise which would otherwise result in the commodity at a high level discharging in one mass that is unpredictable in amount, time and force. The deck can then, as needed, be moved back by selecting the appropriate hydraulic control to reverse the cylinders, and then moved forward again partially or completely, as needed. The use of the invention allows the loading of trucks with corn to a desired level, allows for safe loading of the corn so that the second operator often standing on top of the truck directing the flow into the truck comes far less at risk of being knocked off the truck by the large amounts of corn or the unpredictable and sudden movements of the bin and/or commodity, and further meets the objectives described.

Thus, what is seen is a typical, cost-effective, safe method for initiating flow of commodities as desired.

While there have been shown and described particular embodiments of the invention, it will be obvious to those skilled in the art that changes and modifications may be made without departing from the invention or its equivalent, and, therefore, it is intended by the appended claims to cover all such changes and modifications as fall within the true spirit and scope of the invention.

What is claimed is:

1. A commodity container flow initiating device for initiating gravity flow of a commodity over one side of a bin during unloading, said bin having an inside in which the commodity is contained and defined by a plurality of sides, an unloading side and a bottom, such that when the bin is tipped for unloading the commodity tends to gravitate toward said unloading side, and wherein said unloading side has a bottom edge affixed to the bottom of the container, a top edge opposite the bottom edge and over which the commodity is intended to flow during unloading, and two opposing side edges between the top edge and bottom edge, said invention comprised of:

a. a substantially rigid planar member comprising a deck;
   b. securing means for attaching the deck to the inside of the unloading side of the bin so as to allow the deck to slide a fixed distance in a direction substantially coplaner with the unloading side of the bin; and
   c. means for slidably moving the deck.

2. The commodity container flow initiator device in claim 1 wherein the securing means for attaching the deck to the inside of the unloading side of the bin allow the deck to slide a fixed distance in essentially opposite directions towards and away from the top edge of the unloading side of the bin, respectively, and in a direction substantially coplaner with the unloading side of the bin, and wherein the means for slidably moving the deck are comprised of means for reversibly sliding the deck.

3. The commodity container flow initiator device in claim 2 having control means for selectively moving the deck in a forward or reverse direction in selectable distances.

4. The commodity container flow initiator device in claim 3 wherein the control means are comprised of at least one hydraulic cylinder.

5. The commodity container flow initiator device in claim 1 wherein the means for slidably attaching the deck to the inside of the unloading side of the bin are comprised of at least two rigid guide members affixed to the bin each having a spaced apart portion in each guide member for slidably securing the edges of the deck therein.

6. The commodity container flow initiator device in claim 5 having a polymer slide facilitating bearing member affixed to the securing means and upon which the deck slides.

7. The commodity container flow initiator device in claim 1 wherein the means for slidably moving the deck are comprised of at least one hydraulic cylinder.

8. The commodity container flow initiator in claim 1 wherein the securing means are comprised of a plurality of elongated rigid guide members affixed to the unloading side of the bin, each guide member having a spaced apart portion therein for slidably securing the deck therein, and each guide member having two ends, one near the bottom edge of the bin and one near the top edge of the unloading side.

9. The commodity container flow initiator device in claim 1 having additionally a substantially rigid planar member affixed to the unloading side of the bin so as to allow the deck to slide thereunder between said fixed planar member and the unloading side of the bin.

10. The commodity container flow initiator device in claim 9 wherein the securing means for attaching the deck to the inside of the unloading side of the bin allow the deck to slide in essentially opposite directions towards and away from the top edge of the unloading side of the bin, respectively, and in a direction substantially coplaner with the unloading side of the bin, and wherein the means for slidably moving the deck are comprised of means for reversibly sliding the deck.

11. The commodity container flow initiator device in claim 10 having control means for selectively moving the deck in a forward or reverse direction in selectable distances.

12. The commodity container flow initiator device in claim 11 wherein the control means are comprised of at least one hydraulic cylinder.

13. The commodity container flow initiator device in claim 9 wherein the means for slidably attaching the deck to the inside of the unloading side of the bin having at least two rigid guide members affixed to the bin and having a spaced apart portion in each guide member for slidably securing the edges of the deck therein.

14. The commodity container flow initiator device in claim 13 having a polymer slide facilitating bearing member affixed to the securing means and upon which the deck slides.

15. The commodity container flow initiator device in claim 9 wherein the means for slidably moving the deck are comprised of at least one hydraulic cylinder.

16. The commodity container flow initiator in claim 9 wherein the securing means are comprised of a plurality of elongated rigid guide members affixed to the unloading side of the bin, each guide member having a spaced apart portion therein for slidably securing the deck therein, and each guide member having two ends, one near the bottom edge of the bin and one near the top edge of the unloading side.

17. The commodity container flow initiator device in claims 1, 2, 3, 4, 5, 6, 7, 8, 9, 10, 11, 12, 13, 14, 15, or 16, wherein the deck is of a size sufficiently smaller than the unloading side of the bin so as to allow at least one element of the commodity intended to be unloaded to fit between each edge of the deck and each edge of the unloading side of the bin.

* * * * *